(12) United States Patent
Tai et al.

(10) Patent No.: US 9,747,680 B2
(45) Date of Patent: Aug. 29, 2017

(54) INSPECTION APPARATUS, METHOD, AND COMPUTER PROGRAM PRODUCT FOR MACHINE VISION INSPECTION

(71) Applicant: INDUSTRIAL TECHNOLOGY RESEARCH INSTITUTE, Chutung, Hsinchu (TW)

(72) Inventors: Chung-Li Tai, Tainan (TW); Chih-Kai Chiu, Yunlin County (TW); Yao-Yang Tsai, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 194 days.

(21) Appl. No.: 14/092,146

(22) Filed: Nov. 27, 2013

(65) Prior Publication Data
US 2015/0146964 A1  May 28, 2015

(51) Int. Cl.
*G06K 9/00* (2006.01)
*G06T 7/00* (2017.01)
*G06T 19/20* (2011.01)

(52) U.S. Cl.
CPC .............. *G06T 7/001* (2013.01); *G06T 19/20* (2013.01); *G06T 2207/10024* (2013.01); *G06T 2207/10028* (2013.01); *G06T 2207/30164* (2013.01); *G06T 2219/2012* (2013.01)

(58) Field of Classification Search
None
See application file for complete search history.

(56) References Cited

U.S. PATENT DOCUMENTS

| 4,649,504 A | 3/1987 | Krouglicof et al. |
| 4,833,383 A | 5/1989 | Skarr et al. |
| 4,891,762 A | 1/1990 | Chotiros |

(Continued)

FOREIGN PATENT DOCUMENTS

| CN | 102236749 A | 11/2011 |
| CN | 102288613 A | 12/2011 |

(Continued)

OTHER PUBLICATIONS

Duan, G. et al., *Automatic Optical Inspection of Micro Drill Bit in Printed Circuit Board Manufacturing Based on Pattern Classification*, IEEE International Instrumentation and Measurement Technology Conference, (2008) 279-283.

(Continued)

*Primary Examiner* — Sumati Lefkowitz
*Assistant Examiner* — David Perlman
(74) *Attorney, Agent, or Firm* — Alston & Bird LLP

(57) ABSTRACT

A method for vision machine inspection comprises providing depth information of a target acquired by an image capturing system, determining real-time three-dimensional information of a target object in a predetermined inspecting area based on depth information of at least one real-time image of the target. The method further comprises projecting color pixel information of a real-time color image of the target object to a three-dimensional virtual model based on the real-time three-dimensional information. The real-time color image may be acquired by a color camera system. The method further comprises generating a color three-dimensional virtual model. The color three-dimensional virtual model may comprise the color pixel information.

18 Claims, 4 Drawing Sheets

(56) References Cited

U.S. PATENT DOCUMENTS

| | | | |
|---|---|---|---|
| 4,893,025 A | 1/1990 | Lee | |
| 5,100,229 A | 3/1992 | Lundberg et al. | |
| 5,160,977 A | 11/1992 | Utsumi | |
| 5,608,642 A | 3/1997 | Onodera | |
| 5,621,807 A | 4/1997 | Eibert et al. | |
| 5,760,415 A | 6/1998 | Hauck et al. | |
| 5,819,206 A | 10/1998 | Horton et al. | |
| 5,930,384 A | 7/1999 | Guillemaud et al. | |
| 6,084,594 A | 7/2000 | Goto | |
| 6,175,644 B1 | 1/2001 | Scola et al. | |
| 6,175,652 B1 | 1/2001 | Jacobson et al. | |
| 6,194,860 B1 | 2/2001 | Seelinger et al. | |
| 6,205,243 B1 | 3/2001 | Migdal et al. | |
| 6,664,529 B2 | 12/2003 | Pack et al. | |
| 6,697,761 B2 | 2/2004 | Akatsuka et al. | |
| 6,968,084 B2 | 11/2005 | Satoh | |
| 6,993,450 B2 | 1/2006 | Takemoto et al. | |
| 7,057,614 B2 | 6/2006 | Akatsuka et al. | |
| 7,092,109 B2 | 8/2006 | Satoh et al. | |
| 7,516,421 B2 | 4/2009 | Asano et al. | |
| 7,574,018 B2 | 8/2009 | Luo | |
| 7,676,079 B2 | 3/2010 | Uchiyama et al. | |
| 7,689,003 B2 | 3/2010 | Shannon et al. | |
| 7,698,094 B2 | 4/2010 | Aratani et al. | |
| 7,720,554 B2 | 5/2010 | DiBernardo et al. | |
| 7,747,150 B2 | 6/2010 | Anai et al. | |
| 7,747,151 B2 | 6/2010 | Kochi et al. | |
| 7,822,264 B2 | 10/2010 | Balslev et al. | |
| 7,831,094 B2 | 11/2010 | Gupta et al. | |
| 7,853,072 B2 | 12/2010 | Han et al. | |
| 7,857,021 B2 | 12/2010 | Boyd et al. | |
| 7,860,302 B2 | 12/2010 | Sato et al. | |
| 7,924,441 B1 | 4/2011 | Milanovie | |
| 7,925,049 B2 | 4/2011 | Zhu et al. | |
| 8,031,906 B2 | 10/2011 | Fujimura et al. | |
| 8,036,452 B2 | 10/2011 | Pettersson et al. | |
| 8,059,889 B2 | 11/2011 | Kobayashi et al. | |
| 8,064,686 B2 | 11/2011 | Wagner et al. | |
| 8,073,201 B2 | 12/2011 | Satoh et al. | |
| 8,111,904 B2 | 2/2012 | Wallack et al. | |
| 8,144,238 B2 | 3/2012 | Kotake et al. | |
| 8,160,302 B2 | 4/2012 | Wagg | |
| 8,203,487 B2 | 6/2012 | Hol et al. | |
| 8,270,730 B2 | 9/2012 | Watson | |
| 8,276,088 B2 | 9/2012 | Ke et al. | |
| 8,280,115 B2 | 10/2012 | Matsumura et al. | |
| 8,311,342 B2 | 11/2012 | Schopp et al. | |
| 8,314,939 B2 | 11/2012 | Kato | |
| 8,326,021 B2 | 12/2012 | Kobayashi et al. | |
| 8,379,014 B2 | 2/2013 | Wiedemann et al. | |
| 2002/0033818 A1 | 3/2002 | Lin | |
| 2002/0041327 A1 | 4/2002 | Hildreth et al. | |
| 2002/0044682 A1 | 4/2002 | Weil et al. | |
| 2002/0050924 A1 | 5/2002 | Mahbub | |
| 2002/0052709 A1 | 5/2002 | Akatsuka et al. | |
| 2002/0054297 A1 | 5/2002 | Lee et al. | |
| 2003/0043270 A1 | 3/2003 | Rafey et al. | |
| 2003/0144813 A1 | 7/2003 | Takemoto et al. | |
| 2003/0214502 A1 | 11/2003 | Park et al. | |
| 2005/0018045 A1 | 1/2005 | Thomas et al. | |
| 2005/0058337 A1 | 3/2005 | Fujimura et al. | |
| 2006/0048853 A1 | 3/2006 | Boyd et al. | |
| 2006/0119614 A1 | 6/2006 | Fukui et al. | |
| 2006/0140473 A1* | 6/2006 | Brooksby | G01N 21/9515 382/154 |
| 2006/0152507 A1 | 7/2006 | Lee et al. | |
| 2007/0009149 A1 | 1/2007 | Wagner et al. | |
| 2007/0065004 A1 | 3/2007 | Kochi et al. | |
| 2007/0152037 A1 | 7/2007 | Chen et al. | |
| 2007/0217672 A1 | 9/2007 | Shannon et al. | |
| 2007/0236561 A1 | 10/2007 | Anai et al. | |
| 2008/0031513 A1 | 2/2008 | Hart | |
| 2008/0143721 A1 | 6/2008 | Liou et al. | |
| 2008/0144925 A1 | 6/2008 | Zhu et al. | |
| 2008/0250842 A1 | 10/2008 | Nobis et al. | |
| 2008/0298672 A1 | 12/2008 | Wallack et al. | |
| 2008/0310757 A1 | 12/2008 | Wolberg et al. | |
| 2009/0046895 A1 | 2/2009 | Pettersson et al. | |
| 2009/0066784 A1 | 3/2009 | Stone et al. | |
| 2009/0122146 A1 | 5/2009 | Zalewski et al. | |
| 2010/0002942 A1 | 1/2010 | Watson | |
| 2010/0013908 A1 | 1/2010 | Chiu et al. | |
| 2010/0014710 A1 | 1/2010 | Chen et al. | |
| 2010/0034427 A1 | 2/2010 | Fujimura et al. | |
| 2010/0158361 A1 | 6/2010 | Grafinger et al. | |
| 2010/0324737 A1 | 12/2010 | Handa et al. | |
| 2010/0328682 A1 | 12/2010 | Kotake et al. | |
| 2011/0043610 A1 | 2/2011 | Ren et al. | |
| 2011/0096957 A1 | 4/2011 | Anai et al. | |
| 2012/0026296 A1 | 2/2012 | Lee et al. | |
| 2012/0059624 A1 | 3/2012 | Madhavan | |
| 2012/0113110 A1* | 5/2012 | Lou | G06T 17/20 345/419 |
| 2012/0121135 A1 | 5/2012 | Kotake et al. | |
| 2012/0128204 A1 | 5/2012 | Aoba | |
| 2012/0155751 A1 | 6/2012 | Aoba | |
| 2012/0194644 A1 | 8/2012 | Newcombe et al. | |
| 2012/0243774 A1 | 9/2012 | Chen et al. | |
| 2012/0275654 A1 | 11/2012 | Fujiki et al. | |
| 2012/0294534 A1 | 11/2012 | Watanabe et al. | |
| 2012/0320162 A1 | 12/2012 | Lo et al. | |
| 2013/0010079 A1* | 1/2013 | Zhang | H04N 13/0207 348/47 |
| 2013/0038609 A1 | 2/2013 | Tsai et al. | |
| 2013/0076865 A1 | 3/2013 | Tateno et al. | |
| 2013/0094759 A1 | 4/2013 | Yagi et al. | |
| 2013/0113913 A1* | 5/2013 | Scheid | B64F 5/0045 348/82 |
| 2014/0142486 A1* | 5/2014 | Summit | A61F 5/05841 602/20 |
| 2015/0022669 A1* | 1/2015 | Hall | H04N 17/002 348/187 |

FOREIGN PATENT DOCUMENTS

| | | |
|---|---|---|
| CN | 102422327 A | 4/2012 |
| CN | 102486462 A | 6/2012 |
| TW | 488145 | 5/2002 |
| TW | 527518 | 4/2003 |
| TW | M340479 | 9/2008 |
| TW | 200907826 | 2/2009 |
| TW | I318756 | 12/2009 |
| TW | 201006236 | 2/2010 |
| TW | I369899 | 2/2010 |
| TW | I322392 | 3/2010 |
| TW | I322393 | 3/2010 |
| TW | I332453 | 11/2010 |
| TW | I362281 | 4/2012 |
| TW | 201234278 | 8/2012 |
| TW | M443156 U1 | 12/2012 |
| TW | 201300734 | 1/2013 |
| WO | WO 2013027773 | 2/2013 |

OTHER PUBLICATIONS

Germann, M. et al., *Automatic Pose Estimation for Range Images on the GPU*, Sixth International conference on 3-D Digital Imaging and Modeling (3DIM), IEEE Computer Society (2007) 8 pages.

*Goal of machine vision system: using 2D to generate 3D, real world: 3D, Images 2D, projections of the 3D world: projecting 3D to 2D* (undated) 1-24.

Gordon, I. et al., *What and Where: 3D Object Recognition with Accurate Pose*, Lecture Notes in Computer Science, (undated) 1-16.

Henry, P. et al., *RGB-D Mapping: Using Depth Cameras for Dense 3D Modeling of Indoor Environments* (Undated) 1-15.

Liebelt, J. et al., *Viewpoint-Independent Object Class Detection using 3D Feature Maps*, Computer Vision and Pattern Recognition (CVPR) IEEE, (2008) 8 pages.

Liu, L. et al., *Automatic 3D to 2D Registraton for the Photorealistic Rendering of Urban Scenes*, Computer Vision and Pattern Recognition (2005) 8 pages.

(56) References Cited

OTHER PUBLICATIONS

Lu, Z. et al., *Probabilistic 3D object recognition and pose estimation using multiple interpretations generation*, Journal of the Optical Society of America A, vol. 28, No. 12 (Dec. 2011) 2607-2618.
Najafi, H. et al., *Fusion of 3D and Appearance Models for Fast Object Detection and Post Estimation*, Lecture Note in Computer Science (undated) 10 pages.
Nasir, H. et al., *Image Registration for Super Resolution Using Scale Invariant Feature Transform, Belief Propagation and Random Sampling Consensus*, 18th European Signal Processing Conference, EURASIP (Aug. 2010) 299-303.
Office Action for corresponding Taiwanese Application No. 102147210 dated Dec. 23, 2014.
Ramani, R. et al., *Comparative Analysis of Image Registration using SIFT and RANSAC method*, International Journal of Computational Engineering Research, vol. 2, No. 3, (May-Jun. 2012) 800-805.
Scaramuzza, D. et al., *Exploiting Motion Priors in Visual Odometry for Vehicle-Mounted Cameras with Non-holonomic Constraints* (undated) 8 pages.
Office Action for corresponding Chinese Patent Application No. 201310737172.2 dated Nov. 28, 2016.

\* cited by examiner

INSPECTION APPARATUS, METHOD, AND COMPUTER PROGRAM PRODUCT FOR MACHINE VISION INSPECTION

FIELD

The present disclosure generally relates to an inspection apparatus, method, and computer program product. More specifically, the disclosure relates to a machine vision inspection apparatus, method, and computer program product using three-dimensional information for inspection of a target object.

BACKGROUND

Over the past two or three decades, machine vision has been used increasingly and plays an important role in the design of automated manufacturing systems. A large variety of products, such as printed circuit boards (PCBs), integrated circuits, liquid crystal displays (LCDs), transistors, automotive parts, agricultural machines, and other products that are made in factories may need to be inspected during the production process. An improperly manufactured component may cause extensive damage to, render entirely or at least partially useless, ineffective, or at least not-fully functional, or otherwise impair a system containing the improperly manufactured component. Therefore, there is a need to ensure that all components are properly manufactured before they are used due to the high cost associated with functional failure. Machine vision systems have been used for quality control of products such as by identifying defects of the products, such as missing components, skewed components, reversed components, incorrectly placed components, or wrong valued components. Variance of placement and rotation of an object can result in position error and/or distortion error and negatively impact detection and accuracy. And variance of different objects on the same production line can negatively impact detection and accuracy. Rapid detection and analysis of an object and to quickly assess correct assembly of the object is desirable. Accordingly, there is a need for improved machine vision systems.

BRIEF SUMMARY

Through applied effort, ingenuity, and innovation, solutions to improve machine vision systems have been realized and are described herein. Inspection apparatus, methods, and non-transitory computer program products are described herein that provide improved machine vision systems, such as including real-time three dimensional information of a target object combined with color pixel information and, thereby, are configured to identify a defect of the target object, such as in a predetermined inspecting area and such as identifying an improper manufacturing of the target object. Embodiments of the disclosure combine stereoscopic 2D image-based features and objects with 3D depth and position information for the rapid detection and analysis of objects.

According to one exemplary embodiment of the subject disclosure, a method is described. The method comprises determining real-time three-dimensional information of a target object in a predetermined inspecting area based on depth information of at least one real-time image acquired by an image capturing system. The method further comprises projecting color pixel information of a real-time color image of the target object to a three-dimensional virtual model based on the real-time three-dimensional information. The real-time color image may be acquired by a color camera system. The method further comprises generating a color three-dimensional virtual model. The color three-dimensional virtual model may comprise the color pixel information.

According to one exemplary embodiment of the subject disclosure, an apparatus for vision machine inspection is described. The apparatus comprises a processor. The processor is configured to receive depth information of a target acquired by an image capturing system and determine real-time three-dimensional information of a target object in a predetermined inspecting area based on the depth information of the target. The processor is further configured to receive at least one real-time color image of the target acquired by a color camera system and project color pixel information of a real-time color image of the target object to a three-dimensional virtual model based on the real-time three-dimensional information and the real-time color image. The processor is further configured to generate a color three-dimensional virtual model. The color three-dimensional virtual model comprises the color pixel information.

According to one exemplary embodiment of the subject disclosure, a computer program product is described. The computer program product comprises a non-transitory computer readable storage medium and computer program instructions stored therein. The computer program instructions comprising program instructions are configured to determine real-time three-dimensional information of a target object in a predetermined inspecting area based on depth information of at least one real-time image acquired by an image capturing system, project color pixel information of a real-time color image of the target object to the three-dimensional virtual model based on the real-time three-dimensional information, the real-time color image acquired by a color camera and generate a color three-dimensional virtual model, wherein the color three-dimensional virtual model comprises the color pixel information.

These characteristics as well as additional features, functions, and details of various embodiments are described below. Similarly, corresponding and additional embodiments are also described below.

BRIEF DESCRIPTION OF THE DRAWINGS

Figure 1A:
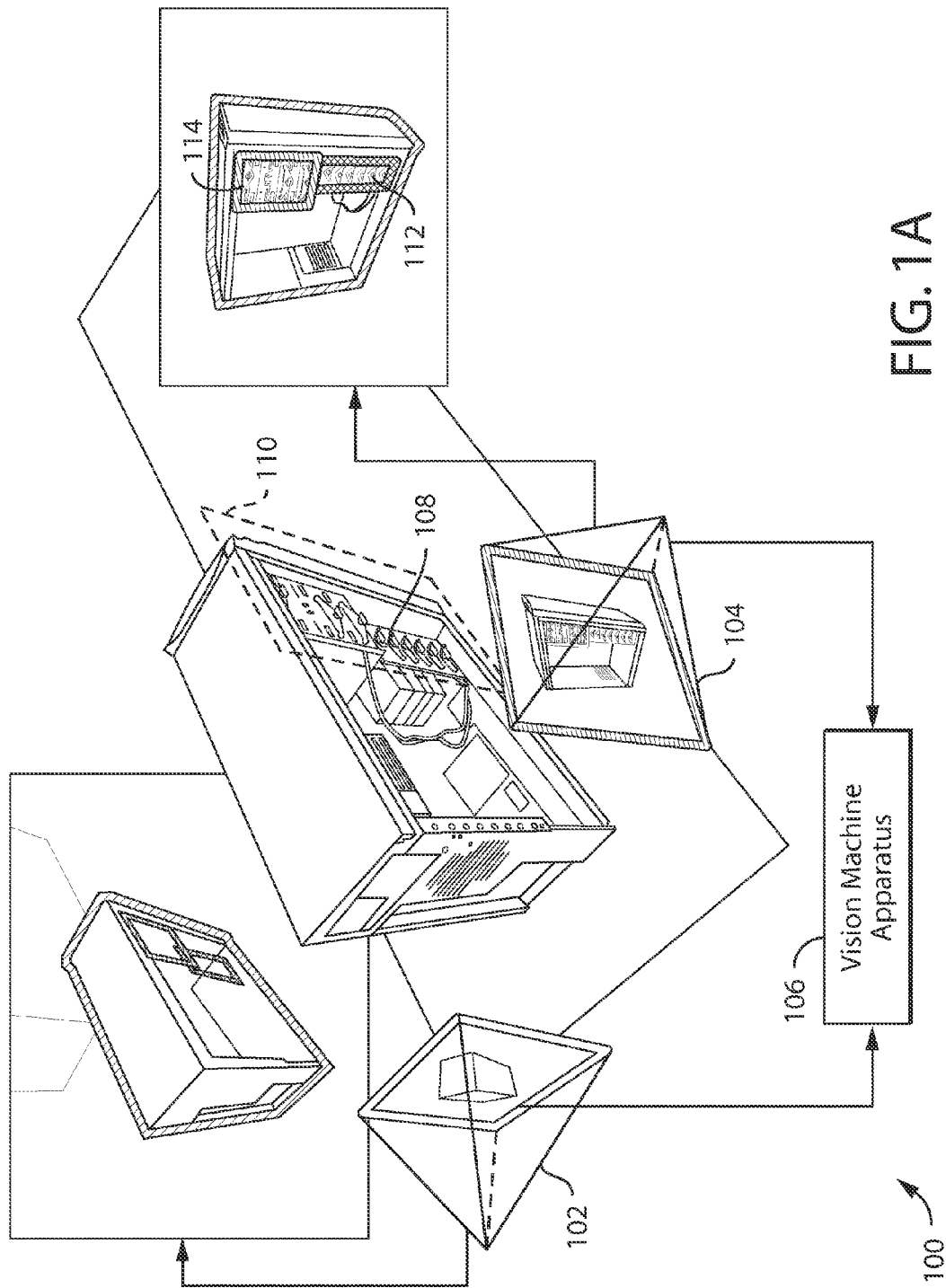
Figure 1B:
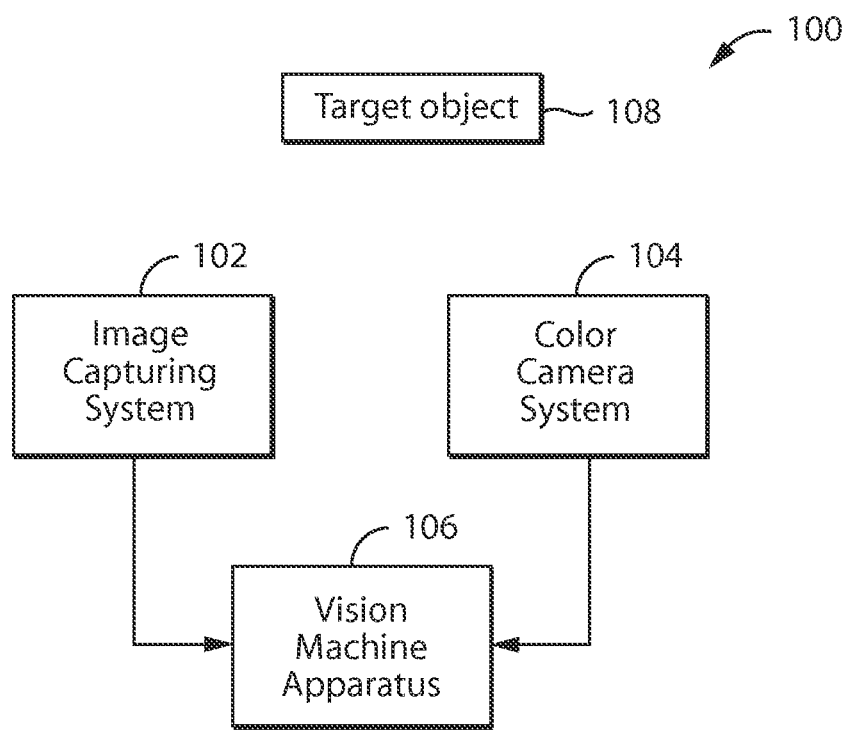
Figure 1C:
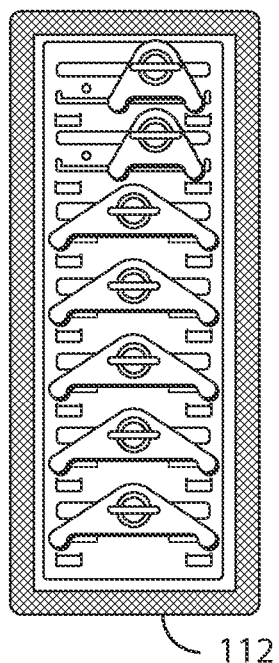
Figure 1D:
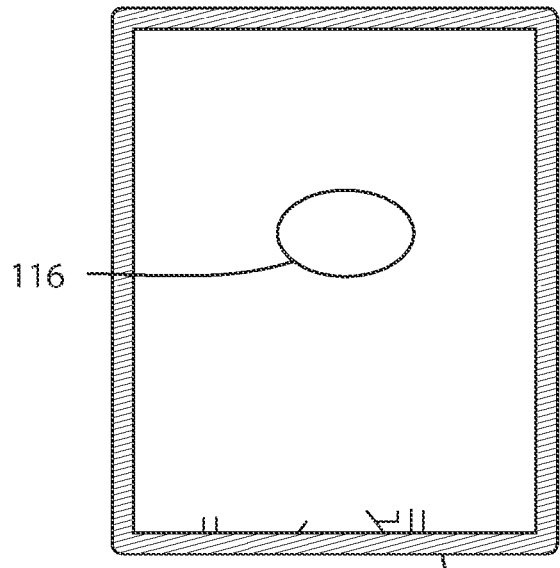
Figure 2:
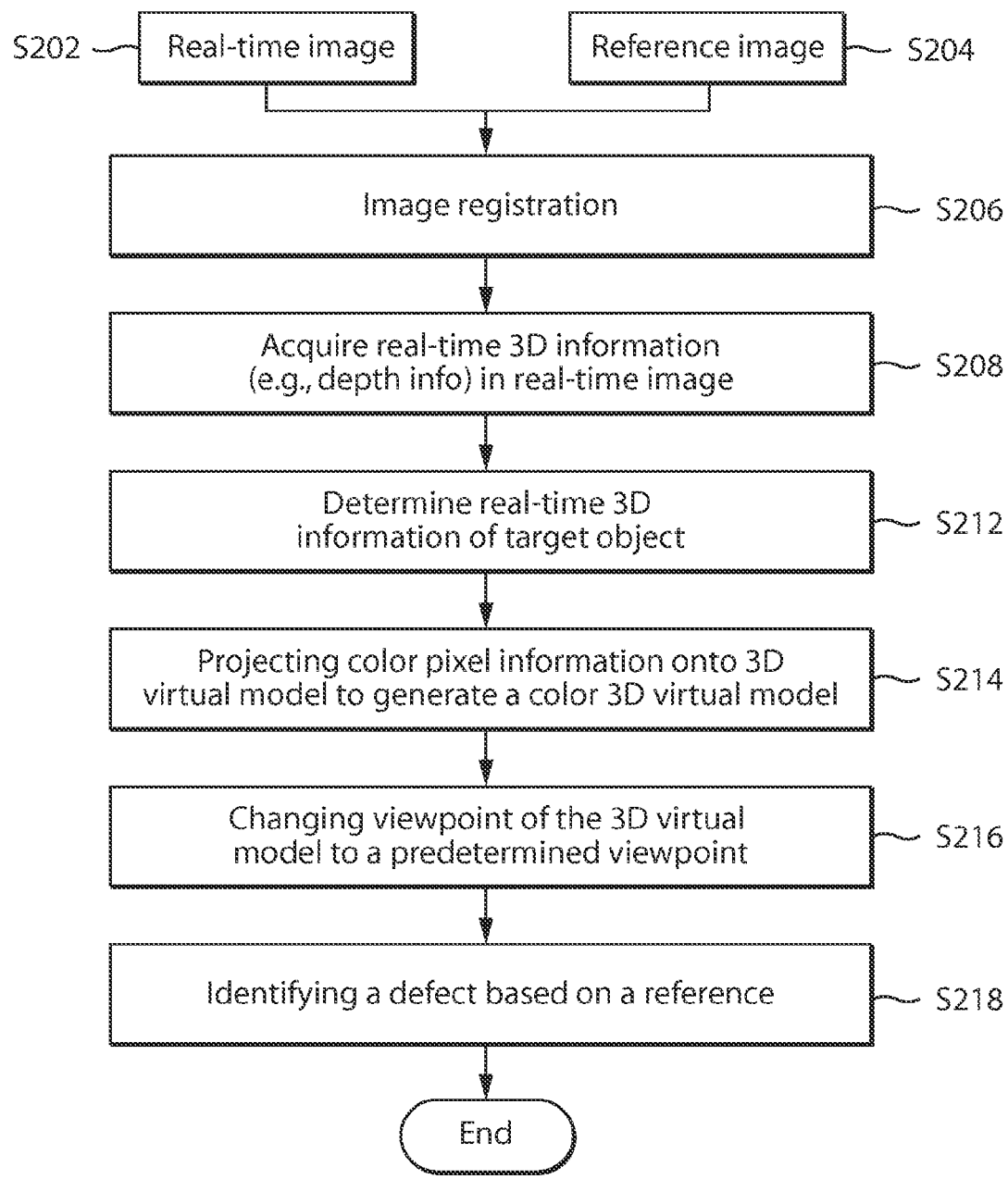
Figure 3:
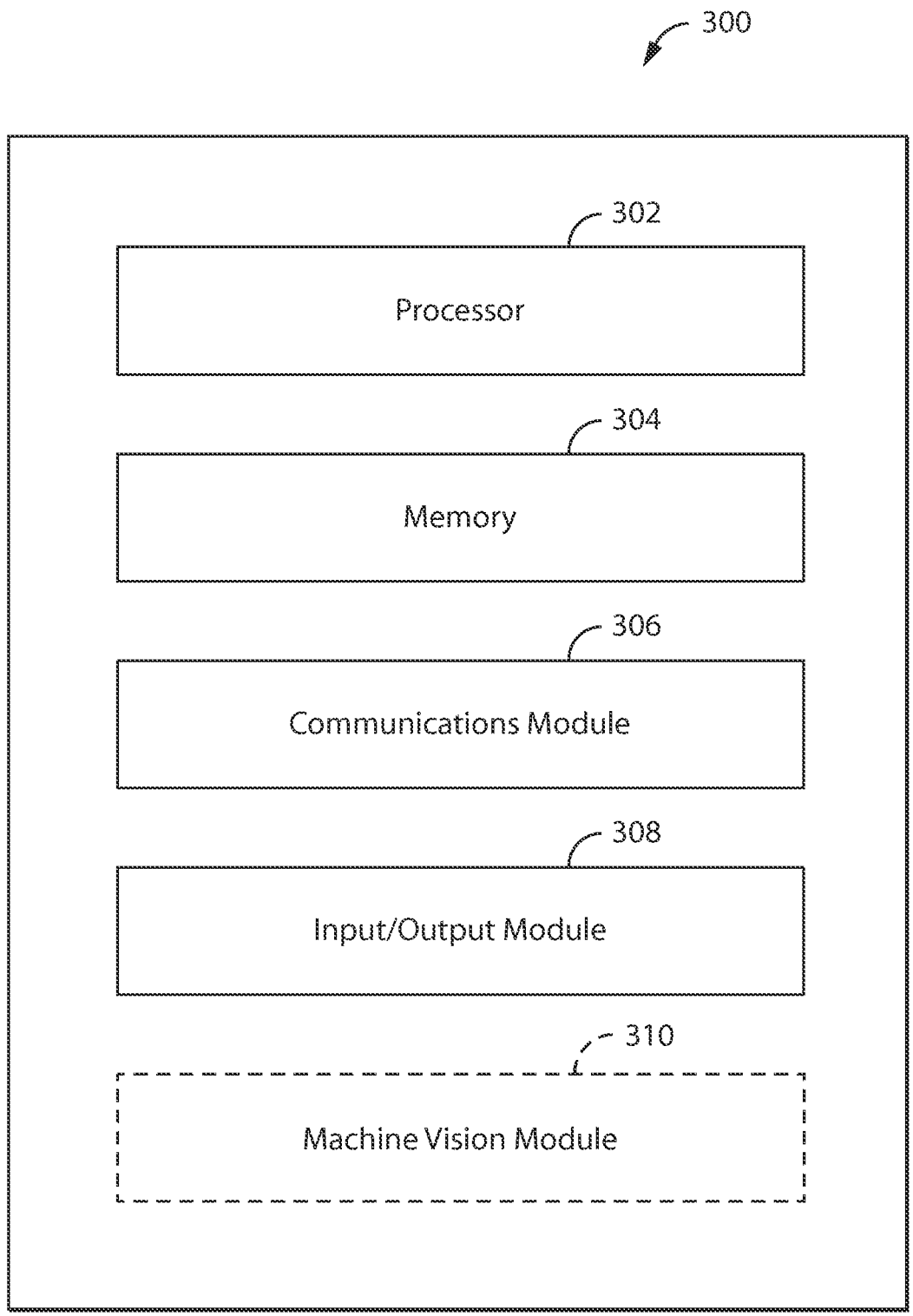

Having thus described some embodiments in general terms, reference will now be made to the accompanying drawings, which are not necessarily drawn to scale. The embodiments illustrated in the figures of the accompanying drawings herein are by way of example and not by way of limitation, and wherein:

FIG. 1A illustrates a semi-schematic graphic diagram of an exemplary vision machine system according to exemplary embodiments of the disclosure;

FIG. 1B illustrates a block diagram of an exemplary vision machine system according to exemplary embodiments of the disclosure;

FIGS. 1C and 1D illustrates semi-schematic graphic diagrams of exemplary sub-areas of an inspecting area of an exemplary vision machine system according to exemplary embodiments of the disclosure;

FIG. 2 illustrates a flow chart of identifying a defect of a target object in accordance with exemplary embodiments of the disclosure; and FIG. 3 illustrates a schematic diagram of example circuitry, in accordance with some embodiments.

DETAILED DESCRIPTION

The subject disclosure now will be described more fully hereinafter with reference to the accompanying drawings, in which preferred embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. In this regard, reference may be made herein to a number of mathematical or numerical expressions or values, and to a number of positions of various components, elements or the like. It should be understood, however, that these expressions, values, positions or the like may refer to absolute or approximate expressions, values or positions, such that exemplary embodiments may account for variations that may occur in the multi-channel optical cell, such as those due to engineering tolerances. Like numbers refer to like elements throughout.

As used herein, the word "exemplary" is used herein to refer to serving as an example, instance, or illustration. Any aspect, feature, function, design, etc. described herein as "exemplary" or an "example" or "examples" is not necessarily to be construed as preferred or advantageous over other aspects, features, functions, designs, etc. Rather, use of the word exemplary is intended to present concepts in a concrete fashion.

FIG. 1A illustrates a semi-schematic graphic diagram of an exemplary vision machine system 100 according to exemplary embodiments of the disclosure. The vision machine system 100 may comprise an image capturing system 102, a color camera system 104, and a vision machine apparatus 106. FIG. 1B illustrates a block diagram of an exemplary vision machine system 100 according to exemplary embodiments of the disclosure, wherein the exemplary vision machine system 100 comprises the image capturing system 102, the color camera system 104, and the vision machine apparatus 106.

Example embodiments of the present disclosure may use, at least, cameras to obtain depth information about a target object and calculate the location (e.g., position) and orientation of the target object, such as using known relative relationships about the cameras and camera parameters to calculate a spatial relationship between the target object and the cameras. And example embodiments of the present disclosure may use, at least, cameras to obtain color information about the target object, and based on calculated spatial relationships between the color cameras and color information and the target object, color information may be projected onto three-dimensional information of the target object. Color information may comprise grayscale information. Such real-time three-dimensional information of a target object may be used and effective, for example, to accommodate for variance of placement and angle of rotation of a target object, such as to convert and/or correct position offset, viewing angles, and dimensional perspective for machine vision inspection, thereby facilitating rapid detection of a target object, or of different target objects, such as multiple different target objects on the same production line, and thereby reducing error due to placement and perspective distortions causes by the position and orientation of the target object. Further, use of multi-angle detection and perspective distortion correction can further improve the machine vision inspection of certain exemplary embodiments of the present disclosure.

With references to FIGS. 1A and 1B, the image capturing system 102 may comprise one or more image capturing cameras capturing one or more real-time images of a target object (e.g., a target object 108) at the same or different times, from different viewpoints and by one or more sensors, such as by charged-coupled-device (CCD) image sensors, time-of-flight sensors, and/or laser sensors, such as laser triangulation sensors. The position of each image capturing camera or system relative to the target object may be provided to the vision machine apparatus 106. To compare and/or integrate the real-time images obtained from different measurements and transform different real-time images into one coordinate system, the at least one real-time image and at least one reference image may be used, such as respectively provided at steps S202 and S204 in the flow chart of FIG. 2. The reference image may be previously captured or computer-generated and stored in a computer-readable storage medium accessible to the vision machine apparatus 106. Upon receipt of the at least one reference image and the at least one real-time image, the image capturing system 102 may perform an image registration process at step S206. During the image registration process, the real-time image may be geometrically aligned with the reference image. For example, the image registration process may be an area-based process to compare patterns in the images. Additionally or alternatively, for example, the image registration process may be a feature-based process to find correspondence between features of the images, such as points, lines, and/or regions. In an instance in which a feature-based process is used, such as a scale invariant feature transform (SIFT) method, real-time features in the real-time image may be detected and extracted. The real-time features may then be compared to reference features of corresponding points, lines, and/or regions in the reference image in a mapping process. A random sampling consensus (RANSAC) process may subsequently be applied to eliminate incorrectly mapped features. Real-time three-dimensional information, such as the depth information in the real-time image, may then be acquired and computed at step S208, such as by aligning a number of real-time features in the real-time image. Other methods may also be used to acquire the real-time three-dimensional information. For example, the image capturing system 102 may acquire real-time three-dimensional information by projecting a laser line onto a target object and measuring displacement in the laser line or by measuring reflections of light from a target object to a sensor. Similarly, the image capturing system 102 may acquire real-time three-dimensional information by projecting a laser pattern onto a target object and calculating the distortion of the pattern.

Referring back to FIG. 1A and FIG. 1B, the image capturing system 102 may provide real-time three-dimensional information (e.g., the depth information) of the at least one real-time image to the vision machine apparatus 106. The vision machine apparatus 106 may use the real-time three-dimensional information of the at least one real-time image and previously computed and stored reference three-dimensional information of the reference image to determine real-time three-dimensional information of the target object 108, such as in a predetermined inspecting area 110 at step S212. The real-time three-dimensional information of the target object 108 may comprise position information such as x, y, z on X-axis, Y-axis and Z-axis respectively. The three-dimensional information may also comprise orientation information such as azimuthal angle $\phi$ or inclination angle θ about one of the axes. The real-time three-dimensional information of the target object 108 may be a position relative to the image capturing system 102. An optimal solution for x, y, z, φ and θ may be found by minimizing the difference between the real-time image and the reference image. The value of argument of the minimum three-dimensional information difference between the real-time image and the reference image may be represented by argmin $\Sigma_{i=0}^{n} F_i^{3D} \times m(x) - f_i^{3D}$, where n is the number of features, i is the $i^{th}$ feature, $F_i^{3D}$ is the real-time three-dimensional information of the real time image, $f_i^{3D}$ is the reference three-dimensional information of the reference image, and m(x) is the real-time three-dimensional information of the target object 108.

The color camera system 104 may comprise at least one color camera, comprising one or more sensors, such as a color image sensor, which may be, for example, a Bayer sensor with an RGB color filter array (CFA), a FOVEON X3™ CMOS sensor, or using three discrete color image sensors, such as three charged-coupled-device (3CCD) image sensors. The position of the at least one color camera of color camera system 104 relative to the at least one image capturing camera of the image capturing system 102 may be fixed and predetermined. The position information may be provided to the vision machine apparatus 106. The vision machine apparatus 106 may determine three dimensional information of the target object 108 relative to the at least one capturing camera of the image capturing system 102 based on, for example, the depth information provided by the image capturing system 102. When the relative position between the at least one image capturing camera of image capturing system 102 and the at least one color camera of color camera system 104 is predetermined, the position and/or orientation of the target object 108 relative to the at least one color camera of the color camera system 104 may be determined by the vision machine apparatus 106 based on the depth information of the target object 108 and the position of the at least one color camera of the color camera system 104 relative to the at least one image capturing camera of the image capturing system 102.

The color camera system 104 may capture color pixel information in the real-time image in the predetermined inspecting area 110 and provide the color pixel information to the vision machine apparatus 106. Based on the position of the at least one color camera of the color camera system 104 relative to the target object 108, the vision machine apparatus 106 may project the color pixel information onto a three-dimensional virtual model at step S214 to generate a color three-dimensional virtual model having the color pixel information. The three-dimensional virtual model may be a real-time three-dimensional virtual model provided by the image capturing system 102, a reference three-dimensional virtual model previously provided by the image capturing system 102, or a predetermined three-dimensional virtual model, such as provided by a three-dimensional scanner, and stored in a computer-readable storage medium accessible to the vision machine apparatus 106. Alternatively, the three-dimensional virtual model may be a three-dimensional virtual model generated by a combination of at least two of a real-time three-dimensional virtual model provided by the image capturing system 102, a reference three-dimensional virtual model previously provided by the image capturing system 102, and a predetermined three-dimensional virtual model and stored in a computer-readable storage medium accessible to the vision machine apparatus 106.

The vision machine apparatus 106 may then analyze to find correspondence, or lack of correspondence, between the color three-dimensional virtual model and a reference to identify similarities and/or differences in color pixel information in the predetermined inspecting area 110. The reference may be a reference color image or a reference color three-dimensional model. As shown in FIG. 1A, the inspecting area 110 may comprise a first sub-area 112, as shown in a front view in FIG. 1C described below, and a second sub-area 114, as shown in a front view in FIG. 1D described below. After comparing the color pixel information in the first sub-area 112 to the reference, the vision machine apparatus 106 may determine that the color pixel information in the first sub-area 112 is similar to or the same as that of its corresponding reference area, or at least similar to or the same as beyond a predefined threshold comparison value. Hence no defect may be detected in the first sub-area 112. In contrast, the vision machine apparatus 106 may find that there is a difference in color pixel information between the second sub-area 114 and its corresponding reference. For example, anticipated colors from the reference for an element of the target object 108, such as a purple and black element, may be found absent in area 116 in the second sub-area 114 based on comparison between the color pixel information in the second sub-area 114 in the color three-dimensional virtual model and that in the corresponding area in the reference.

The vision machine apparatus 106 may change the viewpoint of the color three-dimensional virtual model to a predetermined viewpoint at step S216. For example, as shown in FIGS. 1C and 1D, the vision machine apparatus 106 may rotate the viewpoint of the inspecting area 110 to a front view of the first sub-area 112 in FIG. 1C and a front view of the second sub-area 114 in FIG. 1D. The vision machine apparatus 106 may then identify that a locking mechanism in area 116 may be missed at step S218 based on the comparison conducted above, such as based upon the element expected in area 116 from the reference, as may be determined by the vision machine apparatus 106 by a database lookup of color pixel information, position information, and/or orientation information in relation to the reference and the corresponding elements of the reference. The vision machine apparatus 106 may also compare assembly information of the target object 108 in area 116 to reference assembly information in the corresponding inspecting area to identify an assembly defect. The assembly information may comprise such as layout information about the position and orientation of the assembly components (e.g., the locking mechanism) to the target object 108. An assembly defect may be identified and determined by comparing the assembly information of the target object to the reference assembly information.

Vision machine apparatus 106 may include circuitry, networked processors, or the like configured to perform some or all of the functions and processes described herein and may be any suitable processing device. In some embodiments, vision machine apparatus 106 may function as a "cloud" with respect to the image capturing system 102 and/or color camera system 104. In that sense, vision machine apparatus 106 may include one or more networked processing devices performing interconnected and/or distributed functions. To avoid unnecessarily overcomplicating the disclosure, vision machine apparatus 106 is shown and described herein as a single processing device.

FIG. 3 shows a schematic block diagram of example circuitry 300, some or all of which may be included in vision machine system 100, vision machine apparatus 106, image capturing system 102, and/or color camera system 104. In accordance with some example embodiments, circuitry 300 may include various elements, such as one or more processors 302, memories 304, communications modules 306, and/or input/output modules 308.

In some embodiments, such as when circuitry 300 is included in vision machine apparatus 106, machine vision module 310 may also or instead be included with processor 302. As referred to herein, "module" includes hardware, software, and/or firmware configured to perform one or more particular functions. In this regard, the means of circuitry 300 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 304) that is executable by a suitably configured processing device (e.g., processor 302), or some combination thereof.

Processor 302 may, for example, be embodied as various means for processing including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 302 may comprise a plurality of means for processing. The plurality of means for processing may be embodied on a single computing device or may be distributed across a plurality of computing devices collectively configured to function as circuitry 300. The plurality of means for processing may be in operative communication with each other and may be collectively configured to perform one or more functionalities of circuitry 300 as described herein. In an example embodiment, processor 302 may be configured to execute instructions stored in memory 304 or otherwise accessible to processor 302. These instructions, when executed by processor 302, may cause circuitry 300 to perform one or more of the functions described herein.

Whether configured by hardware, firmware/software methods, or by a combination thereof, processor 302 may comprise an entity capable of performing operations according to embodiments of the present disclosure while configured accordingly. Thus, for example, when processor 302 is embodied as an ASIC, FPGA, or the like, processor 302 may comprise specifically configured hardware for conducting one or more operations described herein. As another example, when processor 302 may be embodied as an executor of instructions, such as may be stored in memory 304, the instructions may specifically configure processor 302 to perform one or more algorithms, methods, operations, or functions described herein. For example, processor 302 may be configured to determine real-time 3D information of a target object, project color pixel information onto a 3D virtual model of a target object, change the viewpoint of a 3D virtual model of a target object, or identify a defect of the target object based upon a reference, among other things.

Memory 304 may comprise, for example, volatile memory, non-volatile memory, or some combination thereof. Although illustrated in FIG. 3 as a single memory, memory 304 may comprise a plurality of memory components. The plurality of memory components may be embodied on a single computing component or distributed across a plurality of computing components. In various embodiments, memory 304 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 304 may be configured to store information, data, applications, instructions, or the like for enabling circuitry 300 to carry out various functions in accordance with example embodiments discussed herein. For example, in at least some embodiments, memory 304 may be configured to buffer input data for processing by processor 302. Additionally or alternatively, in at least some embodiments, memory 304 may be configured to store program instructions for execution by processor 302 and/or data for processing by processor 302. Memory 304 may store information in the form of static and/or dynamic information. This stored information may be stored and/or used by circuitry 300 during the course of performing its functionalities.

Communications module 306 may be embodied as any component or means for communication embodied in circuitry, hardware, a computer program product comprising computer readable program instructions stored on a computer readable medium (e.g., memory 304) and executed by a processing device (e.g., processor 302), or a combination thereof that is configured to receive and/or transmit data from/to another device, such as, for example, a second circuitry 300 and/or the like. In some embodiments, communications module 306 (like other components discussed herein) can be at least partially embodied as or otherwise controlled by processor 302. In this regard, communications module 306 may be in communication with processor 302, such as via a bus. Communications module 306 may include, for example, an antenna, a transmitter, a receiver, a transceiver, network interface card and/or supporting hardware, and/or firmware/software for enabling communications. Communications module 306 may be configured to receive and/or transmit any data that may be stored by memory 304 using any protocol that may be used for communications. Communications module 306 may additionally and/or alternatively be in communication with the memory 304, input/output module 308, and/or any other component of circuitry 300, such as via a bus. Communications module 306 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol.

Input/output module 308 may be in communication with processor 302 to receive an indication of an input and/or to provide an audible, visual, mechanical, or other output. In that sense, input/output module 308 may include means for implementing analog-to-digital and/or digital-to-analog data conversions. Input/output module 308 may include support, for example, for a display, touch screen, keyboard, button, click wheel, mouse, joystick, an image capturing device, microphone, speaker, biometric scanner, and/or other input/output mechanisms. In embodiments where circuitry 300 may be implemented as a server or database, aspects of input/output module 308 may be reduced as compared to embodiments where circuitry 300 may be implemented as an end-user machine or other type of device designed for complex user interactions. In some embodiments (like other components discussed herein), input/output module 308 may even be eliminated from circuitry 300. Alternatively, such as in embodiments wherein circuitry 300 is embodied as a server or database, at least some aspects of input/output module 308 may be embodied on an apparatus used by a user that is in communication with circuitry 300. Input/output module 308 may be in communication with memory 304, communications module 306, and/or any other component(s), such as via a bus. Although more than one input/output module and/or other component can be included in circuitry 300, only one is shown in FIG. 3 to avoid overcomplicating the disclosure (e.g., like the other components discussed herein).

In some embodiments, machine vision module 310 may also or instead be included and configured to perform the functionality discussed herein related to determining real-time 3D information of a target object, projecting color pixel information onto a 3D virtual model of a target object, changing the viewpoint of a 3D virtual model of a target object, or identifying a defect of the target object based upon a reference, among other things. In some embodiments, some or all of the functionality of machine vision module 310 may be performed by processor 302. In this regard, the example processes discussed herein can be performed by at least one processor 302 and/or machine vision module 310. For example, non-transitory computer readable storage media can be configured to store firmware, one or more application programs, and/or other software, which include instructions and other computer-readable program code portions that can be executed to control processors of the components of circuitry 300 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor, and/or other programmable apparatus's circuitry to produce a machine, such that the computer, processor, or other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various forms, including entirely of hardware or any combination of software and hardware. Furthermore, embodiments may take the form of a computer program product on at least one non-transitory computer readable storage medium having computer readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to components, such as functional modules, system components, and circuitry. Below is a discussion of an example process flow chart describing functionality that may be implemented by one or more components and/or means discussed above and/or other suitably configured circuitry.

According to one aspect of the subject disclosure, a vision machine apparatus 106 of exemplary embodiments of the subject disclosure generally operates under control of a computer program. The computer program for performing the methods of exemplary embodiments of the disclosure may include one or more computer-readable program code portions, such as a series of computer instructions, embodied or otherwise stored in a computer-readable storage medium, such as the non-volatile storage medium.

FIG. 2 is a flow chart reflecting processes and control of methods, systems, and computer programs according to exemplary embodiments of the disclosure. It will be understood that each block or step of the flow chart, and combinations of blocks or steps in the flow chart, may be implemented by various means, such as hardware alone or in combination with firmware, and/or software including one or more computer program instructions. As will be appreciated, any such computer program instructions may be loaded onto a computer, special purpose computer, or other programmable data processing apparatus, such as processor 302, to produce a machine, or machines, such that the computer program product includes the instructions which execute on the computer or other programmable data processing apparatus (e.g., hardware) to create means for implementing the functions described herein, such as the functions specified in the block(s) or step(s) of the flow chart of FIG. 2.

These computer program instructions may also be stored in a computer-readable storage device (e.g., memory 304) that may direct a computer or other programmable data processing apparatus to function in a particular manner, such that the instructions stored in the computer-readable storage device produce an article of manufacture including instruction computer-readable instructions for implementing the functions described herein, such as the functions specified in the block(s) or step(s) of the flow chart of FIG. 2. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions described herein, such as the functions specified in the block(s) or step(s) of the flow chart of FIG. 2.

Accordingly, blocks or steps of the flow chart support means and combinations of means for performing and/or implementing the specified functions, combinations of steps for performing and/or implementing the specified functions and program instruction means for performing and/or implementing the specified functions. It will also be understood that one or more blocks or steps of the flow chart, and combinations of blocks or steps in the flow chart, may be implemented by special purpose hardware-based computer systems which perform the specified functions or steps, or combinations of special purpose hardware and computer instructions.

It will be appreciated by those skilled in the art that changes could be made to the examples described above without departing from the broad inventive concept. It is understood, therefore, that this disclosure is not limited to the particular examples disclosed, but it is intended to cover modifications within the spirit and scope of the disclosure as defined by the appended claims. Although specific terms are employed herein, they are used in a generic and descriptive sense only and not for purposes of limitation.

What is claimed is:

1. A method comprising:
   receiving depth information of a target object acquired by an image capturing system;
   determining real-time three-dimensional information of the target object in a predetermined inspecting area based on the depth information of at least one real-time image of the target object;
   determining a position and/or orientation of the target object relative to at least one color camera of a color camera system based on the depth information of the at least one real-time image of the target object and position information of the at least one color camera of the color camera system relative to at least one image capturing camera of the image capturing system, wherein the position information of the at least one color camera of the color camera system relative to the at least one image capturing camera of the image capturing system is fixed and predetermined; and
   projecting color pixel information of a real-time color image of the target object onto a three-dimensional virtual model based on the determined position and/or orientation of the target object relative to the at least one color camera of the color camera system to generate a color three-dimensional virtual model comprising the color pixel information, wherein the color pixel information is based on the real-time three-dimensional information of the target object and the real-time color image of the target object acquired by the color camera system.

2. The method of claim 1, further comprising identifying a defect of the target object in the predetermined inspecting area based on a reference.

3. The method of claim 1, further comprising providing one of a real-time three-dimensional virtual model of the target object by the image capturing system, a predetermined three-dimensional virtual model of the target object by the image capturing system, and a predetermined three-dimensional virtual model of the target object by a three-dimensional scanner.

4. The method of claim 1, further comprising comparing assembly information of the target object in the predetermined inspecting area to reference assembly information in the corresponding inspecting area to identify an assembly defect.

5. The method of claim 1, further comprising acquiring position and viewpoint of the image capturing system.

6. The method of claim 1, further comprising providing a plurality of reference images of the target object in the predetermined inspecting area and storing the reference images in a computer-readable storage medium.

7. The method of claim 1, further comprising changing a viewpoint of the three-dimensional virtual model to a predetermined viewpoint.

8. An apparatus for vision machine inspection comprising:
   a processor configured to:
      receive depth information of a target object acquired by an image capturing system;
      determine real-time three-dimensional information of the target object in a predetermined inspecting area based on the depth information of at least one real-time image of the target object;
      determine a position and/or orientation of the target object relative to at least one color camera of the color camera system based on the depth information of the at least one real-time image of the target object and position information of the at least one color camera of the color camera system relative to at least one image capturing camera of the image capturing system, wherein the position information of the at least one color camera of the color camera system relative to the at least one image capturing camera of the image capturing system is fixed and predetermined; and
      project color pixel information of the at least one real-time color image of the target object onto a three-dimensional virtual model based on the determined position and/or orientation of the target object relative to the at least one color camera of the color camera system to generate a color three-dimensional virtual model comprising the color pixel information, wherein the color pixel information is based on the real-time three-dimensional information of the target object and the at least one real-time color image of the target object acquired by the color camera system.

9. The apparatus of claim 8, wherein the processor is configured to identify a defect of the target object in the predetermined inspecting area based on a reference.

10. The apparatus of claim 8, wherein the processor is configured to compare assembly information of the target object in the predetermined inspecting area to reference assembly information in the corresponding inspecting area to identify an assembly defect.

11. The apparatus of claim 8, wherein the processor is configured to acquire position and viewpoint of the image capturing system.

12. The apparatus of claim 8 further comprising a storage medium to store a plurality of reference images of the predetermined inspecting area.

13. The apparatus of claim 8, wherein the processor is configured to change a viewpoint of the three-dimensional virtual model to a predetermined viewpoint.

14. A computer program product comprising a non-transitory computer readable storage medium and computer program instructions stored therein, the computer program instructions comprising program instructions configured to:
   provide depth information of a target object acquired by an image capturing system;
   determine real-time three-dimensional information of the target object in a predetermined inspecting area based on the depth information of at least one real-time image of the target object;
   determine a position and/or orientation of the target object relative to at least one color camera of a color camera system based on the depth information of the at least one real-time image of the target object and position information of the at least one color camera of the color camera system relative to at least one image capturing camera of the image capturing system, wherein the position information of the at least one color camera of the color camera system relative to the at least one image capturing camera of the image capturing system is fixed and predetermined; and
   project color pixel information of a real-time color image of the target object onto a three-dimensional virtual model based on the determined position and/or orientation of the target object relative to the at least one color camera of the color camera system to generate a color three-dimensional virtual model comprising the color pixel information, wherein the color pixel information is based on the real-time three-dimensional information of the target object and the real-time color image of the target object acquired by the color camera system.

15. The computer program product of claim 14, further comprising program instructions configured to identify a defect of the target object in the predetermined inspecting area based on a reference of the predetermined inspecting area.

16. The computer program product of claim 14, further comprising program instructions configured to acquire position and viewpoint of the image capturing system.

17. The computer program product of claim 14, further comprising program instructions configured to provide a plurality of reference images of the target object in the predetermined inspecting area and store the plurality of reference images in the storage medium.

18. The computer program product of claim 14, further comprising program instructions configured to change a viewpoint of the three-dimensional virtual model to a predetermined viewpoint.

* * * * *